Jan. 18, 1944.    A. A. ASHTON    2,339,449
CAT SHAFT ASSEMBLY FOR DRAWWORKS
Filed Oct. 17, 1941
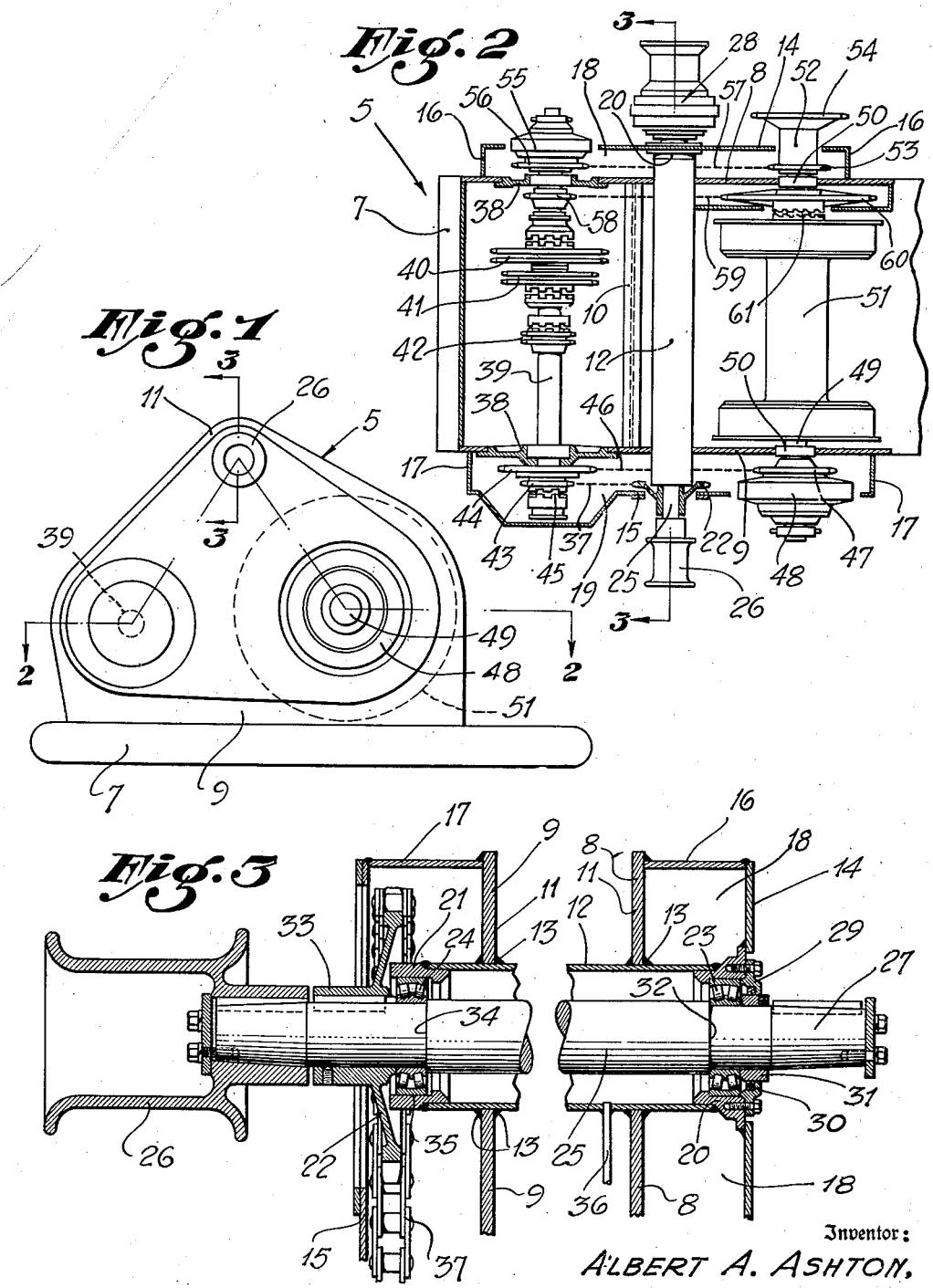
Inventor:
ALBERT A. ASHTON,
By
Attorney.

Patented Jan. 18, 1944

2,339,449

UNITED STATES PATENT OFFICE 2,339,449

CAT SHAFT ASSEMBLY FOR DRAW WORKS

Albert A. Ashton, Los Angeles, Calif., assignor to Emsco Derrick & Equipment Company, Los Angeles, Calif., a corporation of California Application October 17, 1941, Serial No. 415,391

10 Claims. (Cl. 254—187)

My invention relates to drawworks of sturdy but light weight construction wherein the rotating parts are carried by a supporting structure consisting primarily of upright and reclining steel plates welded so as to provide partition and enclosing walls and to carry the static and working loads which are transmitted from the working parts to the supports, and relates in particular to a rotary drawworks wherein a continuous tubular wall is extended from one side to the other of the supporting structure and is connected to the principal vertical plates of the supporting structure at spaced points so as to add greatly to the rigidity of the structure and at the same time support in exact alignment the bearings which rotatably carry the cat shaft of the drawworks.

It is an object of the invention to provide in a drawworks structure of the character described in the preceding paragraph a simple means for protecting and supporting the cat shaft in an elevated position, which means may be readily made from a steel tube secured in place in such manner that a number of valuable results are accomplished. These valuable results include contribution toward the important result of producing a rotary drawworks of less weight for a given capacity, and maintaining alignment of the cat shaft bearings with assurance that they will not be disaligned as a result of any heavy strain being placed in the supporting structure of the drawworks.

A further object of the invention is to provide in a rotary drawworks a cat shaft support comprising a laterally extending tube having bearing cages secured in the ends thereof, and a further object is to provide in this arrangement a positioning of the parts so that the cat shaft bearings held in the bearing cages may be amply lubricated and the overflow lubricant will be discharged so as to amply lubricate the sprocket and chain means through which the cat shaft is driven.

Further objects and advantages of the invention will be understood from the following description and the drawing, wherein:

Fig. 1 is a schematic side elevation showing a drawworks embodying the invention.

Fig. 2 is a sectional view showing the drawworks, the section being taken as indicated by the line 2—2 of Fig. 1.

Fig. 3 is an enlarged fragmentary sectional view taken as indicated by the line 3—3 in Figs. 1 and 2, a central portion of the structure being removed to permit the ends of the cat shaft and its support to be drawn closer together.

The drawworks 5 has a supporting structure including a base 7 of a somewhat flat horizontal construction, this base 7 being rigid and of such strength that it will hold the superimposed part of the drawworks rigidly regardless of or independently of the foundation on which it is supported. The drawworks, although of relatively light construction, is a self-contained unit wherein the structural parts cooperate to produce rigidity to maintain the parts thereof in proper working relation, without cooperation of a specially prepared foundation.

In substantially parallel relation vertical plates 8 and 9 are extended upward from the sides of the base 7. The lower edges of the plates 8 and 9 extend into or merge with the base so as to be rigidly held, and the lower portions of the plates 8 and 9 may be connected and reinforced by supplementary means such as indicated by the I-beam 10 shown in Fig. 2. The upper portions 11 of the plates 8 and 9 are connected by a steel tube 12, the connection being made by welds 13 extended around the openings in the plates 8 and 9 through which the end portions of the tube 12 extend, as shown in Fig. 2 and Fig. 3, the tube 12 thereby serving to rigidly hold the upper portions of the plates 8 and 9 in fixed spaced relation.

Other vertical plates are employed, such as the vertical plates 14 and 15 which cooperate with lateral plates 16 and 17 to form housings 18 and 19 adjacent the heavier plates 8 and 9. The tube 12 is rigidly connected to at least one of these supplementary vertical plates. For example, a steel bearing cage 20 is welded in the end of the tube 12 which passes through the plate 8, and this cage 20 is in turn welded to the vertical plate 14. Another bearing cage 21 is secured in the opposite end of the tube 12 in a position to lie within the housing 19 at such distance from the plate 15 that a sprocket 22 may be disposed adjacent the cage 21 but within the housing 19.

Roller bearings 23 and 24 are held respectively in the cages 20 and 21, and these roller bearings support a cat shaft 25, which has on one end thereof a simple cat head 26 and on the other end thereof has a tapered portion 27 adapted to receive a geared cat head device 28 indicated diagrammatically in Fig. 2, the members 26 and 28 being thereby supported in a position extended from the sides of the drawworks. The outer end of the bearing cage 20 has a cover ring 29 with a grease retainer 30 cooperating with the outer face of a sleeve 31 which positions the inner race of the bearing 23 against a shoulder 32 on the cat shaft 25. The hub 33 of the sprocket 22 is keyed on the left end of the cat shaft 25, as shown in Fig. 3, and this hub 33 holds the inner race of the bearing 24 against a shoulder 34 on the cat shaft 25. The bearing cage 21 has a counter bore 35 in which the outer race of the bearing 24 may move axially through such short distances as may be necessary to compensate for temperature changes in the lengths of the members 12 and 25.

During the operation of the drawworks lubricant may be pumped into the tube 12 through an oil delivery pipe 36, thereby providing in the tube 12 a bath of oil to thoroughly lubricate the bearings 23 and 24. The opening at the right end of the tube 12 is closed by the grease seal 30, but the oil may flow freely through the bearing 24 and down over the lip of the bearing cage 21 to the peripheral portion of the sprocket 22 which will convey this oil directly to the drive chain 37, which runs over the sprocket 22 to drive the cat shaft 25.

At the lower rearward portion of the drawworks, bearings 38 are supported by the plates 8 and 9. A jack shaft 39 supported by and extending through the bearings 38 has thereon sprockets 40, 41, and 42 with associated clutch means whereby the shaft 39 may be driven from an engine disposed at the rear of the drawworks. The end of the jack shaft 39, which projects into the housing 19, has thereon sprockets 43 and 44 arranged to be driven when associated clutch means 45 is engaged. The sprocket 43 engages the chain 37 for driving the sprocket 22 of the cat shaft, and a chain 46 is carried over the sprocket 44 and over a sprocket 47 associated with a clutch 48 on the drum shaft 49. The drum shaft 49 is supported by bearings 50 which are carried in the forward portion of the plates 8 and 9. A drum 51 is carried by the shaft 49 in the space between the vertical plates 8 and 9. It will be noted that both the chains 37 and 46 and the sprockets over which these chains run are situated within the housing 19.

On the end of the drum shaft 49, which projects within the housing 18, there is a sleeve 52, the inner end of this sleeve carrying a sprocket 53 within the housing 18, and the outer end of the sleeve carrying a rotary drive sprocket 54 in a position adjacent the outer wall 14 of the housing 18 to drive a chain, not shown, which is carried to the rotary machine to drive the same. On the end of the jack shaft 39 which extends within the housing 18, there is a clutch 55 carrying a sprocket 56 connected by a chain 57 with the sprocket 53 so that the sleeve 52 may be driven from the jack shaft 39 when the clutch 55 is actuated. For slow speed driving of the drum 51, a sprocket 58 is fixed on the jack shaft 39, and a chain 59 is carried from this sprocket 58 to a relatively large sprocket 60, which is rotatable on the drum shaft 49 and has associated clutch means 61 whereby driving connection with the drum 51 may be made.

I claim as my invention:

1. In a drawworks, the combination of: a base; vertical plates secured to and extending up from the side portions of said base; a jack shaft supported on said plates for rotation above the rearward part of said base; a drum supported on said plates for rotation above the forward portion of said base; drive means connecting said jack shaft and said drum; a tube extending from side to side of the drawworks in a plane elevated from said base, the end portions of said tube projecting beyond the vertical planes of said plates and being fixed to the upper portions of said vertical plates so as to reenforce the same and tie the upper portions thereof rigidly together; bearings supported in the end portions of said tube; a cat shaft extending through said tube and being rotatably supported by said bearings; drivable means connected to an end portion of said cat shaft adjacent an end of said tube; and means for driving said drivable means.

2. In a drawworks, the combination of: a base; vertical plates secured to and extending up from the side portions of said base; a jack shaft supported on said plates for rotation above the rearward part of said base; a drum supported on said plates for rotation above the forward portion of said base; drive means connecting said jack shaft and said drum; a tube extending from side to side of the drawworks in a plane elevated from said jack shaft and drum, the end portions of said tube being welded to said vertical plates so as to act as a reenforcing means for said plates and provide a transverse chamber; bearings supported in the end portions of said tube; a cat shaft extending through said tube and being rotatably supported by said bearings; a sprocket for driving said cat shaft, said sprocket being disposed on the end of said cat shaft adjacent one end of said tube; drive means for said sprocket including a chain extending thereover; and means communicating with the interior of said tube whereby lubricant may be fed into said tube to lubricate the bearings in the ends of said tube, the end of said tube adjacent said sprocket having an opening through which lubricant from the interior of said tube may flow to lubricate said sprocket and said chain.

3. In a drawworks, the combination of: a base; vertical plates secured to and extending up from the side portions of said base; a jack shaft supported on said plates for rotation above the rearward part of said base; a drum supported on said plates for rotation above the forward portion of said base; drive means connecting said jack shaft and said drum; a tube extending from side to side of the drawworks in a plane elevated from said jack shaft and drum, the end portions of said tube being welded to the upper portion of said vertical plates; a bearing cage welded to each end of said tube; a first bearing in one of said bearing cages and a second bearing in the other of said bearing cages; a cat shaft extending through said tube and being rotatable on said bearings; a grease seal at the end of said cage which has said first bearing therein; drive means for said cat shaft comprising a sprocket adjacent said second bearing, and a chain extending thereover; and means whereby lubricant may be fed into said tube to lubricate said bearings, the end of said tube adjacent said second bearing having an opening through which lubricant from the interior of said tube may flow to lubricate said sprocket and said chain.

4. In a drawworks, the combination of: a base; vertical plates secured to and extending up from the side portions of said base; a jack shaft supported on said plates for rotation above the rearward part of said base; a drum supported on said plates for rotation above the forward portion of said base; drive means connecting said jack shaft and said drum; plate means adjacent the outer face of and secured to one of said vertical plates to form a housing; a tube extending from the upper portion of one of said vertical plates to the upper portion of the other and being fixed to both said vertical plates so as to be supported thereby and so as to serve as a reinforcing means for the upper portions of said vertical plates and plate means, an end of said tube extending into said housing; bearing means carried by said tube; a cat shaft extending through said tube and being rotatably supported therein by said bearing means; a sprocket adjacent said end of said tube in said housing for driving said cat shaft; a chain in said housing running over said sprocket; and sprocket means in said housing engaging said chain to drive the same whereby said cat shaft may be driven.

5. In a drawworks, the combination of: a base; vertical plates secured to and extending up from the side portions of said base; a jack shaft supported on said plates for rotation above the rearward part of said base; a drum supported on said plates for rotation above the forward portion of said base; drive means connecting said jack shaft and said drum; plate means adjacent the outer face of and secured to one of said vertical plates to form a housing; a tube extending from the upper portion of one of said vertical plates to the upper portion of the other and being fixed to both said vertical plates so as to be supported thereby and so as to serve as a reinforcing means for the upper portions of said vertical plates, an end of said tube extending into said housing; bearing means carried by said tube; a cat shaft extending through said tube and being rotatably supported therein by said bearing means; a sprocket adjacent said end of said tube in said housing for driving said cat shaft; a chain in said housing running over said sprocket; means to impart a driving force to said chain whereby said cat shaft may be driven; and a cat head device on the other end of said cat shaft.

6. In a drawworks, the combination of: a base; vertical plates secured to and extending up from the side portions of said base; a jack shaft supported on said plates for rotation above the rearward part of said base; a drum supported on said plates for rotation above the forward portion of said base; drive means connecting said jack shaft and said drum; plate means adjacent the outer face of and secured to one of said vertical plates to form a housing; a tube extending from the upper portion of one of said vertical plates to the upper portion of the other and being fixed to both said vertical plates so as to be supported thereby and so as to serve as a reinforcing means for the upper portions of said vertical plates, an end of said tube extending into said housing; bearing means carried by said tube; a cat shaft extending through said tube and being rotatably supported therein by said bearing means; a sprocket adjacent said end of said tube in said housing for driving said cat shaft; a chain in said housing running over said sprocket; means to impart a driving force to said chain whereby said cat shaft may be driven; a cat head device on the other end of said cat shaft; and means for delivering lubricant into said tube to lubricate said bearing means, said end of said tube being open so that lubricant may flow therefrom to said drivable means.

7. In a drawworks, the combination of: a base; vertical plates secured to and extending up from the side portions of said base; plate means adjacent and secured to one of said plates forming a housing, said plate means and securing means structurally reenforcing said vertical plate; a tube extending between the upper portions of said vertical plates and being welded thereto so as to reinforce the upper portions of said plates, an end of said tube communicating with said housing; a jack shaft rotatably supported on said plates above said base, an end of said jack shaft projecting into said housing; a drum shaft rotatably supported on said plates above said base, an end of said drum shaft projecting into said housing; drive means in said housing connecting said end of said jack shaft with said end of said drum shaft; bearings supported by said tube; a cat shaft extending through said tube and being rotatably supported by said bearings; a sprocket in said housing at said end of said tube for driving said cat shaft; and chain and sprocket means in said housing connecting said sprocket with said end of said jack shaft whereby said cat shaft may be driven.

8. In a drawworks having a base, spaced supporting means comprising a pair of substantially vertical plates rigidly secured to and extending upward from said base, walls forming a housing adjacent and secured to one of said supporting means for structurally reenforcing said supporting means, a jack shaft supported on said plates above said base with an end thereof projecting into said housing; a drum shaft rotatably supported on said plates above said base with an end thereof projecting into said housing, drive means in said housing connecting said ends of said jack shaft and said drum shaft, the combination of: a tube extending horizontally between said supporting means and being rigidly connected thereto, an end of said tube communicating with said housing; bearing means carried by said tube; a cat shaft extending through said tube and being rotatably supported by said bearing means; and drive means for said cat shaft disposed in said housing, one part of said drive means being located at said end of said tube and having means to connect it to said cat shaft, and another part of said last named drive means being connected to said end of said jack shaft.

9. In a drawworks having a base, spaced supporting means comprising substantially parallel plates welded to and extending upward from said base, said plates having openings near the upper edges thereof, a horizontal drum shaft rotatably carried by said supporting means, a power shaft rotatably carried by said supporting means, and drive means to connect said shaft: a substantially horizontal tube extending between said spaced supporting means, through said openings, and being rigidly connected by welds to said plates so as to reenforce the same; bearing means carried by said tube; a cat shaft extending through said tube and being rotatably supported by said bearing means; a cat head on an end of said cat shaft; and drive means connected to said cat shaft at one end of said tube.

10. In a drawworks, the combination of: a base; substantially parallel vertical plates secured to and extending upward from said base; a jack shaft journaled in bearings carried by said plates; a drum shaft journaled in bearings carried by said plates; a wall secured to each of said plates in parallel spaced relation thereto and coextensive with the major portions thereof by cross members, each of said plates with its wall and cross members providing a combined light weight structurally strong vertical frame element and protective housing; a tube extending from side to side of the drawworks in a plane elevated above the said jack shaft and drum, the end portions of said tube being rigidly secured to said vertical plates; bearings supported in the end portions of said tube; a cat shaft extending through said tube and rotatably supported by said bearings; and sprocket and chain drives connecting said jack shaft with said drum shaft and with said cat shaft, at least two of said drives being protectively encased in said two housings respectively, said jack shaft, drum shaft, and cat shaft extending into at least one of said housings.

ALBERT A. ASHTON.